United States Patent [19]

Feins et al.

[11] 3,897,365

[45] July 29, 1975

[54] HYDROTREATING CATALYST AND PROCESS THEREFOR

[75] Inventors: Irvin Ralph Feins, Westport; Robert Murphy Yarrington, Old Greenwich, both of Conn.

[73] Assignee: American Cyanamid Company, Stamford, Conn.

[22] Filed: Sept. 20, 1973

[21] Appl. No.: 399,217

[52] U.S. Cl. ............ 252/435; 252/437; 208/216; 208/254
[51] Int. Cl. ............................................. B01j 11/82
[58] Field of Search ........ 252/437, 455 R, 465, 435; 208/216

[56] References Cited

UNITED STATES PATENTS

| | | | |
|---|---|---|---|
| 3,114,701 | 12/1963 | Jacobson et al. | 252/465 X |
| 3,287,280 | 11/1966 | Colgan et al. | 252/435 |

*Primary Examiner*—Patrick P. Garvin
*Attorney, Agent, or Firm*—William J. van Loo

[57] ABSTRACT

There is disclosed a hydrotreating catalyst consisting of a support of molybdenum oxide-inorganic oxide gel and carried thereon nickel oxide and molybdenum oxide so as to provide an active catalyst having an increased content of molybdenum oxide over prior catalysts and the process of preparation thereof.

5 Claims, No Drawings

HYDROTREATING CATALYST AND PROCESS THEREFOR

This invention relates to a hydrotreating catalyst and a method for preparing the same. More particularly, the hydrotreating catalyst comprises a support of molybdenum oxide and alumina carrying thereon nickel oxide and additional molybdenum oxide.

Hydrotreating catalysts comprising an alumina support with promoter contents of nickel and molybdenum oxides are well known. This basic composition within various ranges of the individual components is widely used in hydrotreating various petroleum fractions for use as fuel oils, gasoline, and the like. Useful compositions are generally in the range of about 1 to 6 weight percent nickel oxide, 8 to 20 weight percent molybdenum oxide, and correspondingly 91 to 74 weight percent of an inorganic oxide gel of which a major portion is alumina. Although catalysts of a composition within the ranges specified have good activity when used with typical petroleum fractions, recent developments with respect to fuel shortages and environmental pollution have given rise to a need for more active hydrotreating catalysts, particularly with respect to desulfurization of the petroleum fractions. This need developed as a result both of a more stringent requirement as to the residual sulfur content in the petroleum products, e.g. fuel oils and gasoline, and of the use of feed stocks which initally contain higher percentages of sulfur than were previously typical.

The activity of a catalyst is influenced by the nature of the support to some extent and to a greater extent by the nature of the promoters employed therewith. The actual amount of promoters present has some effect and increased amounts thereof can improve activity. However, the promoter contents cannot be indiscriminately increased because certain problems may develop. From a practical point of view there is no advantage in adding additional promoter if improved activity does not result and there is the disadvantage of increased cost without compensating improved activity. There is also the problem as to the physical capacity of the support to contain increased amounts of promoters. That is, when the amounts of promoters added to a particular support exceed its ability to contain such amounts, the excess promoters dust off the support and contaminate the product obtained. This dusting off of promoter content can reduce activity of the catalyst upon continued use to a value less than that of catalyst prepared without excess contents of promoters. Thus, in addition to product and reactor contamination, the use of excess promoter contents can result in reduced activity during use of catalysts containing such excesses.

Conventional catalysts comprising molybdenum oxide, nickel oxide, and alumina have established limits as to promoter contents. The nickel oxide range encompasses the minimum amount having a beneficial effect on activity and the maximum amount that increases the beneficial effect. The molybdenum oxide content encompasses the minimum amount at which desirable activity is obtained and the maximum amount that can be tenaciously adhered to the substrate without the dusting off problem.

The conventional catalyst comprising nickel oxide, molybdenum oxide, and alumina is prepared by forming the alumina into a support and then impregnating the support with suitable quantities of promoter sources to provide the desired amounts thereon. Attempts to increase the content of molybdenum oxide on the support by impregnation procedures resulted in dusting off of the excess molybdenum oxide. This was evident upon calcination of the thus-impregnated support and resulted in loss of molybdenum oxide. Upon subsequent use of the catalyst, further losses of molybdenum oxide by dusting off were evident in the reactor and product stream. The effective amount of molybdenum oxide adhered to the support so impregnated was actually less than could be obtained by impregnation using less molybdenum source. Thus, the catalyst evaluated in such case was inferior in activity and created special problems compared to the conventional catalyst.

An alternative procedure for increasing the promoter content of the catalyst is that of incorporating the promoter sources in the alumina before it is formed into its useful structure. Attempts to incorporate the combination of nickel and molybdenum sources with alumina as it was formed resulted in an inactive catalyst. This result occurred even when the amounts of nickel and molybdenum sources added were such as to provide the conventional ranges of nickel oxide and molybdenum oxide in association with alumina in the final catalyst.

Because of the problems discussed above, hydrotreating catalysts comprising nickel oxide, molybdenum oxide, and alumina have been limited to the ranges of composition specified. Attempts to obtain hydrotreating catalysts of activity improved over these conventional catalysts have been directed to use of added or alternative promoter contents because of the limited operative ranges of composition.

In preparing fuels from typical feed stocks, it is customary to subject the feed stocks to fluid catalytic cracking first and then to hydrotreating. Catalytic cracking modifies the feed stock to contain a greater proportion of desired fuel components at the expense of less desirable components. Hydrotreating then reduces the sulfur content of the product. Additionally, hydrotreating reduces the content of basic nitrogen in the product and may provide saturation, isomerization and other effects to some extent. The present fuel crisis arises from several factors, depletion of domestic crude sources and limited refinery capacity. The first factor requires importation of external crude sources and utilization of secondary sources, both of which generally complicate typical refinery processes and, in particular, generally require greater sulfur removal. Because of the necessary increased usage of refinery facilities in processing external and secondary crude sources, production rates lag. Increasing demands for fuels tend to overtake any increases in fuel production that existing refinery capacity can generate. In addition, the increased awareness of environmental pollution arising from use of fuels and processing thereof have given rise to additional problems that tend to slow refinery production rates. Such problems include greater sulfur removal than previously required as well as reduced environmental pollution accompanying refinery operations.

One method of minimizing the above-mentioned problems in refinery operations would be that of hydrotreating a feed stock prior to subjecting it to catalytic cracking. This preliminary hydrotreating would be beneficial in many ways. By reducing sulfur, it would minimize environmental pollution from the regenerator stack associated with catalytic cracking. By removing basic nitrogen, it would serve the same purpose. In addition, since some saturation of aromatic constituents of the feed stocks would accompany hydrotreating, coking in the catalytic cracking operation would be reduced with a consequent beneficial effect on cracking catalyst activity. The presence of nitrogen compounds in the feed stocks also have a poisoning effect on cracking catalyst and the preliminary hydrotreating operation would also benefit catalytic cracking by reducing nitrogen impurities. However, the potential benefits to be derived from a preliminary hydrotreating operation have to be considered in light of potential disadvantages thereof. Increased costs and handling steps would be involved because of the requirement for a subsequent, secondstage, hydrotreating operation after cracking. The use of the preliminary hydrotreating step could reduce production rates and offset any advantages gained in production yields and purity. If a highly active hydrotreating catalyst could be provided which would make preliminary hydrotreating particularly effective, subsequent cracking and second-state hydrotreating could be carried out with greater efficiency and at higher production rates than currently achieved. Thus, the provision for a highly active hydrotreating catalyst constitutes an urgent need of the refinery industry. Provision of such a catalyst using currently available materials by readily adaptable procedures would provide a significant and rapid advance in the art.

In accordance with the present invention, there is provided a hydrotreating catalyst consisting essentially of (a) a support consisting of about 5 to 15 weight percent molybdenum oxide and, correspondingly, about 95 to 85 weight percent of an inorganic oxide gel consisting of at least 50 weight percent alumina, up to about 50 weight percent silica, and up to a total of 10 weight percent of one or more other inorganic oxide gels, said gel content totaling 100 and (b) carried on said support from about 1 to 6 weight percent of nickel oxide and from about 10 to 20 weight percent of molybdenum oxide, said percentages being based on the total weight of said (a) and (b) and the total percentage of molybdenum oxide present from said (a) and (b) being greater than 20 weight percent and less than about 35 weight percent.

The catalyst of the present invention is a highly acitve hydrotreating catalyst which contains a greater amount of molybdenum oxide than is retained by conventional active catalysts of the same type. Its increased activity in sulfur removal eminently qualifies it for use as a pre-cracking hydrotreating catalyst. The greater sulfur removal is felt to arise from deeper hydrocracking of polynuclear sulfur compounds and removal of sulfur content therefrom. Such removal in a pre-cracking hydrotreating operation eliminates such action during cracking and the adverse effects on the cracking catalyst that would ensue. Thus, the cracking operation will be more effective and the second-stage hydrotreating operation will be more readily accomplished because of the deeper sulfur removal effected by the catalyst of the invention in pre-cracking hydrotreatment. The catalyst of the present invention, of course, may be employed in other hydrotreating reactions where advantage will arise from its increased activity relative to conventional hydrotreating catalysts.

The process of the present invention, which provides the improved catalyst described above, comprises (I) uniformly admixing an aqueous ammonium molybdate solution with an inorganic oxide gel consisting of at least 50 weight percent alumina, up to about 50 weight percent silica, and up to a total of 10 weight percent of one or more other inorganic oxide gels, said gel percentages totaling 100, the amount of ammonium molybdate solution admixed being sufficient to provide from about 5 to 15 weight percent of molybdenum oxide based on the total calcined weight of molybdenum oxide and inorganic oxide gel; (II) forming the resulting mixture into a catalyst support; (III) drying and calcining the formed support; (IV) impregnating the calcined support with an aqueous orthophosphoric acid solution of a nickel source and a molybdenum source so as to provide on said support from about 1.0 to 3.5 weight percent phosphorus, from about 1 to 6 weight percent nickel oxide and from about 10 to 20 weight percent molybdenum oxide, said percentages being based on the total calcined weight of said catalyst, and the total percentage of molybdenum oxide resulting from support and impregnation being greater than 20 weight percent and less than about 35 weight percent based on the weight of the calcined catalyst; and (V) drying and calcining the impregnated support.

In carrying out hydrotreating reactions, the feed stock is contacted with a bed of catalyst under suitable conditions of temperature and pressure in the presence of hydrogen gas flow. Desulfurization of the feed stock occurs and is not greatly influenced by the operating pressure employed. Basic nitrogen removal also occurs and is influenced to a greater extent than sulfur removal by operating pressure. The presence of basic nitrogen in feed stocks is extremely small compared to sulfur contents, however, and the extent to which basic nitrogen is removed is less critical than that of sulfur. The removal of basic nitrogen by conventional hydrotreating catalysts, therefore, has not been a critical problem but sulfur removal has. Increasing the operating pressure in the hydrotreating reaction can improve removal of basic nitrogen while not having any significant effect on sulfur removal.

A catalyst of the present invention, as discussed, results in greatly increased sulfur removal compared to that achieved by conventional catalysts under the same conditions of operation. However, there is some loss in basic nitrogen removal as a result of use of a catalyst of the present invention at the specified operating conditions compared to that achieved with conventional catalysts. As indicated, the loss in basic nitrogen removal is not critical and can be overcome by increases in operating pressure. Thus, the greatly improved sulfur removal afforded by catalysts of the present invention completely overshadows the small losses in basic nitrogen removal that result.

In preparing the catalyst of the present invention, the total content of molybdenum oxide associated therewith arises from two sources, the support itself and subsequent impregnation of the support. As a result, the distribution of molybdenum oxide in the catalyst is distinct from that associated with other catalysts and the total amount of molybdenum oxide in the present active catalyst is greater than in related active catalysts. The catalyst of the present invention, therefore, is readily distinguished from conventional catalysts by analytical techniques which indicate total molybdenum oxide content and distribution thereof over the catalyst volume.

As the inorganic oxide gel used in preparing the support, there may be used those porous gels conventionally employed in preparing catalyst supports, so long as the specified composition limits are met. Alumina, typically in the form of gamma-alumina, obtained by precipitation upon mixing solutions of sodium aluminate and aluminate sulfate according to conventional procedures, is a preferred inorganic oxide gel. It may constitute the entire gel composition but must constitute at least 50 weight percent of the gel composition on a solids basis, i.e. exclusive of water. In addition to alumina, the gel may consist of up to about 50 weight percent silica. Silica may be present as a separately prepared gel, a cogel, as an alumina coating, coated by alumina, or as a zeolite. If desired, one or more other inorganic oxide gels, such as titania, zirconia, vanadia and the like may total up to about 10 weight percent of the gel composition. Thus the gel will constitute 50–100 weight percent alumina, 0–50 weight percent silica and 0–10 weight percent of one or more other inorganic oxide gels, the percentages totaling 100.

In addition to the inorganic oxide, the support will also consist of molybdenum oxide. The support will consist of 5 to 15 weight percent molybdenum oxide and, correspondingly, from 95 to 85 weight percent of inorganic oxide gel, as defined above. Preferably, the support will consist of about 6 to 12 weight percent of molybdenum oxide and, correspondingly, 94 to 88 weight percent of gamma-alumina.

In preparing the support, an aqueous solution of the requisite amount of an ammonium molybdate is prepared and added to the inorganic oxide gel in xerogel state. The resulting composition is uniformly admixed to provide a formable consistency. Processing aids useful in forming processes may be employed, if desired, so long as their use does not adversely influence the primary constituents. Thus, suitable viscosity modifiers, densifiers, porosity controllers, pH adjusters, and the like may be added. Useful ammonium molybdates are $(NH_4)_2 MoO_4$, $(NH_4)_2 Mo_2O_7$, $(NH_4)_6 Mo_7O_{24}$, and the like A preferred ammonium molybdate is ammonium heptamolybdate. The consistency of the mixture prepared will depend upon the method of forming contemplated. Variations in consistency are controlled by the amount of water present as well as viscosity modifiers, if used. The ammonium molybdate upon subsequent processing of the support will provide molybdenum oxide and the usage of ammonium molybdate should, accordingly, fulfill the requirements for molybdenum oxide as indicated above.

After the uniform mixture of desired consistency is obtained, it is formed into a support in accordance with conventional procedures. A preferred forming procedure is that of extrusion following conventional procedures employing a mix-muller and an auger-type extruder. Alternative forming procedures include pelletizing, tabletizing, molding, and the like, in accordance with conventional procedures. Thus, with respect to forming per se, no new techniques are involved and further discussion is deemed unnecessary.

After the support is formed, it is dried and calcined in accordance with conventional procedures. Since no new techniques with respect to drying and calcining per se are involved, further discussion thereof is also deemed unnecessary.

After the calcined support is provided, it is impregnated in accordance with conventional techniques to provide the desired promoter content. The composition of the impregnation solution is critical although the procedure of impregnation is not. Thus, any conventional impregnating teachnique may be employed so long as the critical impregnating solution is employed.

The impregnating solution consists of an aqueous orthophosphoric acid solution as solvent for the promoter sources. Residues of phosphoric acid, expressed as phosphorus percentages, will be retained on the subsequent calcined catalyst and the concentration of orthophosphoric acid in the volume of impregnating solution to be employed for a given weight of support will be adjusted accordingly. Since the volume of impregnating solution to be employed for a given weight of support will vary depending upon the method of impregnation selected and the porosity of the support and since the concentration of the impregnating solution will be influenced by these variables as well as by the levels of promoters desired, it is more meaningful to discuss the composition of the impregnating solutions in terms of the calcined catalysts to be obtained.

In preparing the impregnating solution, an aqueous solution of sufficient orthophosphoric acid content to provide from about 1.0 to 3.5, preferably 1.5 to 3.0, weight percent of phosphorus, based on the calcined weight of the catalyst, is employed. In this acid solution is dissolved sufficient of an acid-soluble nickel source to provide from about 1 to 6, preferably 2 to 5 weight percent of nickel oxide based on the weight of the calcined catalyst. Suitable nickel salts include nickel carbonate (preferred), nickel oxide, nickel hydroxide, nickel formate, and nickel acetate. After the nickel source has been dissolved completely in the acid solution, there is added sufficient of a molybdenum source to provide from about 10 to 20 weight percent of molybdenum oxide, based on the weight of the calcined catalyst. It is to be noted that the content of molybdenum source in the impregnating solution does not result in the total content of molybdenum oxide associated with the calcined catalyst and that a portion of the total content of molybdenum oxide results from that making up the support. Once the content of molybdenum oxide making up the support has been established within the range specified therefor, the amount of molybdenum source added to the impregnating solution will be sufficient to provide a total molybdenum oxide content, based on the total weight of the calcined catalyst, of at least 20 but not more than 35, preferably about 22 to 28 weight percent. As the molybdenum source, there is preferably used molybdenum trioxide. However, other molybdenum sources may be used in part so long as they are compatible with the impregnating solution. Thus the ammonium molybdates previously enumerated may make up a minor portion of the molybdenum source as may phosphomolybdic acid taking into account the phosphorus presence that thus arises. The acid solution of nickel source with its added content of molybdenum source is then heated to form a clear solution. Heating is preferably carried out by refluxing to ensure complete solution. After solution is complete, the impregnating solution is ready to use and may be cooled without precipitation.

After conventional impregnation, as discussed above, is carried out, the impregnated support is dried and calcined according to conventional procedures. Since the drying and calcining of the impregnated support follow conventional procedures, further discussion thereof is deemed unnecessary.

The invention is more fully illustrated by the examples which follow wherein all parts and percentages are by weight unless otherwise designated. Physical properties of the catalysts or supports were determined in accordance with standard procedures known to the art.

In order to establish the superior performance of catalysts of the present invention over the typical prior art catalysts, comparison tests were run using as the standard what is currently considered to be the best available commercial hydrotreating catalyst. This catalyst consists of an all-alumina support carrying thereon 3 weight percent nickel oxide and 18 weight percent molybdenum oxide. The weight and volume activities of this standard catalyst were arbitrarily assigned values of 100 and the corresponding activities of catalysts of the present invention were then expressed relative to the standard values.

EXAMPLE 1

A. PREPARATION OF SUPPORT

An ammonium molybdenate solution was prepared by adding 0.36 pounds of 29 percent aqueous ammonia to 17 pounds of deionized water. To the solution were added 2.25 pounds of ammonium heptamolybdate [$(NH_4)_2Mo_7O_{24} \cdot 4H_2O$] which dissolved therein. There were then added 701.3 grams of urea and stirring was effected until solution was complete.

Into a muller were added 14 pounds of spray-dried alumina prepared by precipitation of sodium aluminate by aluminum sulfate according to conventional procedure. The solution prepared above was then added and mulling was begun. Over a five minute period an additional 4 pounds of the same alumina were added. Mulling was then continued for 45 minutes. There were then added an additional 275 grams of the same alumina and 40 grams of a polyacrylamide extrusion aid. Mulling was effected for an additional 5 minutes.

The muller mix, of 38.9 percent solids and pH 8.0, was then extruded through orifices of 0.070 inch diameter and cut to 0.2 inch length in accordance with conventional procedures. The cut extrudates were then dried at 120°C. for 17 hours. After drying, the extrudates were calcined at 1200°F. for 1.5 hours.

The carrier obtained had a composition of 12 percent $MoO_3$ and 88 percent $Al_2O_3$ and a water pore volume of 0.865 cc/g.

B. PREPARATION OF CATALYST

To 100 cc. of deionized water were added 13.7 cc. of 86.1% $H_3PO_4$. To the solution were slowly added 18.6 grams $NiCO_3$. After reaction ceased, there were added 52.9 grams $MoO_3$ and the mixture was refluxed for 17 hours. A clear solution resulted.

The solution prepared was diluted to a volume of 250 cc. Upon 300 grams of the carrier prepared in A in rotating mill was uniformly sprayed the diluted solution. The impregnated carrier was then dried at 250°C. for 4 hours and then calcined at 900°F. for 1 hour. The catalyst was of pale fawn color and had a nominal composition of 3% NiO, 34% $MoO_3$, 1.7% P, and the balance $Al_2O_3$. Catalyst properties are given in Table I.

EXAMPLE 2

A. PREPARATION OF SUPPORT

The procedure of Example 1, part A, was repeated in every material detail except that no ammonia was employed. The water pore volume of the support obtained was 0.72 cc./g.

B. PREPARATION OF CATALYST

The procedure of Example 1, part B, was repeated in every material detail except that the amount of 86.1% $H_3PO_4$ was increased to 24.5 cc. The catalyst obtained was of pale fawn color and had a nominal composition of 3% NiO, 24% $MoO_3$, 3.2% P, and the balance $Al_2O_3$. Catalyst properties are also given in Table I.

TABLE I

CATALYST PROPERTIES

| COMPOSITION | CATALYST OF EXAMPLE 1 | CATALYST OF EXAMPLE 2 |
|---|---|---|
| % NiO | 3 | 3 |
| % $MoO_3$ | 24 | 24 |
| % P | 1.7 | 3.0 |
| % $Al_2O_3$ | 71.3 | 70.0 |
| Compacted Bulk Density, G/CC | .61 | .81 |
| Extrudate Diameter Length, Average, Inch | 0.063 | 0.062 |
| Crush Strength Lbs. | 12 | 21 |
| Pore Volume Lc/G | 0.63 | 0.39 |

EXAMPLE 3

The catalysts of Examples 1 and 2 were evaluated in hydrotreating using a feedstock of the following impurities:

| Sulfur (%) | 0.996 |
| Basic Nitrogen | 484 ppm. |
| Total Nitrogen | 1400 ppm. |

Sulfur and total nitrogen analyses were according to the procedure of Dohrmann. Basic nitrogen analysis was by the Universal Oil Products' Method 269–59. Hydrotreating conditions were as follows:

| Operating Pressure, Psig | 750 |
| Temperature, °F. | 725 |
| Liquid Hourly Space Velocity, Reciprocal Hours | 2 |
| Hydrogen Flow, Standard Cubic Feet Per Barrel | 6,000 |

Results obtained are given in Table II.

The results of sulfur removal indicate the greatly improved activity of catalysts of the present invention compared to the standard. Although the results of basic nitrogen removal indicate somewhat reduced activity of catalysts of the present invention compared to the standard, the extent of nitrogen removal is considered adequate and can be improved by use of increased pressure. The significant effect of catalysts of the present invention is a deeper removal of sulfur, which is essential to achieve air quality standards for sulfur compounds.

EXAMPLE 4

The procedure of Example 1 was followed except that the support was prepared to contain 6% $MoO_3$ and 94% $Al_2O_3$ and the support was impregnated to add 3% NiO, 1.7%P, and 18% $MoO_3$. Evaluation of the catalyst in hydrotreating as in Example 3 indicated relative volume and weight activities significantly superior to the standard and substantially the same as obtained with the catalyst of Example 1.

TABLE II

| CATALYST | CATALYST PERFORMANCE | | |
|---|---|---|---|
| | RELATIVE SULFUR REMOVAL | | RELATIVE BASIC NITROGEN REMOVAL VOLUME (%) |
| | VOLUME (%) | WEIGHT (%) | |
| Standard | 100 | 100 | 100 |
| Example 1 | 175 | 226 | 70 |
| Example 2 | 175 | 176 | 79 |

We claim:

1. A process for preparing a pre-cracking hydrotreating catalyst which comprises: (I) uniformly admixing an aqueous ammonium molybdate solution with an inorganic oxide gel consisting of at least 50 weight percent alumina, up to about 50 weight percent silica, and up to a total 10 weight percent of titania, zirconia, or vanadia, said gel percentages totaling 100, the amount of ammonium molybdate solution admixed being sufficient to provide from about 5 to 15 weight percent molybdenum oxide based on the total calcined weight of molybdenum oxide and inorganic oxide gel: (II) forming the resulting mixture into a catalyst support: (III) drying and calcining the formed support; (IV) impregnating the calcined support with an aqueous orthophosphoric acid solution of a nickel source and a molybdenum source so as to provide on said support from about 1.0 to 3.5 weight percent phosphorus, from about 1 to 6 weight percent nickel oxide, and from about 10 to 20 weight percent molybdenum oxide, said percentages being based on the total calcined weight of said catalyst and the total percentage of molybdenum oxide resulting from said support and impregnation being greater than 20 weight percent and less than about 35 weight percent based on the weight of the calcined catalyst; and (V) drying and calcining the impregnated support.

2. The process of claim 1 wherein in step (I) the amount of ammonium molybdate solution employed is sufficient to provide 6-12 weight percent molybdenum oxide.

3. The process of claim 1 wherein in step (IV) the amount of nickel source is sufficient to provide 2-5 weight percent nickel oxide.

4. The process of claim 1 wherein in step (IV) the amount of orthophosphoric acid is sufficient to provide 1.5 to 3.0 weight percent phosphorus.

5. The process of claim 1 wherein the amounts of ammonium molybdate in step (I) and of molybdenum source in step (IV) are sufficient to provide 22-28 weight percent molybdenum oxide.

* * * * *